United States Patent [19]

Voirin

[11] Patent Number: 4,735,788

[45] Date of Patent: Apr. 5, 1988

[54] PROCESS OF REMOVING OF COS AND $CS_2$ COMPOUNDS CONTAINED IN AN INDUSTRIAL GAS

[75] Inventor: Robert Voirin, Orthez, France

[73] Assignee: Societe Nationale Elf Aquitaine (Production), Paris, France

[21] Appl. No.: 900,100

[22] PCT Filed: Dec. 11, 1985

[86] PCT No.: PCT/FR85/00358

§ 371 Date: Sep. 11, 1986

§ 102(e) Date: Sep. 11, 1986

[87] PCT Pub. No.: WO86/03426

PCT Pub. Date: Jun. 19, 1986

[30] Foreign Application Priority Data

Dec. 12, 1984 [FR] France ............................... 84 18971

[51] Int. Cl.[4] .................... B01J 8/00; C01B 17/00; C01B 17/16; C01B 31/20
[52] U.S. Cl. .................................... 423/244; 423/230
[58] Field of Search .......... 423/244 R, 244 A, 242 A, 423/230

[56] References Cited

U.S. PATENT DOCUMENTS

| | | | |
|---|---|---|---|
| 3,050,571 | 8/1962 | Fleming et al. | 423/244 |
| 4,422,958 | 12/1983 | Dupin | 423/244 X |
| 4,485,189 | 11/1984 | Dupin | 423/244 X |
| 4,544,534 | 10/1985 | Dupin et al. | 423/230 |

FOREIGN PATENT DOCUMENTS

| | | | |
|---|---|---|---|
| 1667590 | 6/1971 | Fed. Rep. of Germany. | |
| 2501532 | 9/1982 | France. | |
| 952555 | 3/1964 | United Kingdom. | |
| 16015 | 3/1964 | U.S.S.R. | 423/244 |

*Primary Examiner*—Gregory A. Heller
*Attorney, Agent, or Firm*—Burgess, Ryan and Wayne

[57] ABSTRACT

A process is provided for eliminating COS and $CS_2$ compounds contained in an industrial gas. The gas containing an appropriate quantity of water vapor is contacted with a titanium oxide catalyst arranged in a high temperature reaction zone. The reaction is carried out while maintaining at specific values the ratio R between the number of water vapor moles and the number of moles of the compound(s) COS and $CS_2$ in the supplied gas in contact with the catalyst, as well as the temperature at the outlet from the reaction zone. The process is applicable to the treatment of industrial gases usable in organic synthesis and containing COS and $CS_2$ as impurities susceptible of perturbating synthesis reactions.

12 Claims, No Drawings

PROCESS OF REMOVING OF COS AND CS$_2$ COMPOUNDS CONTAINED IN AN INDUSTRIAL GAS

FIELD OF THE INVENTION

The invention relates to a process of elimination of COS and CS$_2$ contained in an industrial gas, and more particularly in a gas which will subsequently be used in organic synthesis.

BACKGROUND OF THE INVENTION

Different industrial gases produced with a view to being used in organic synthesis, such as the gases resulting from the gasification of coal that can be used in the methanation reactions or hydrogen sulfide used in the chemical industry for the synthesis of thioorganic products contain, depending on the methods by which they were obtained, more or less large quantities of COS and/or CS$_2$. These organic sulfur compounds are generally undesireable for the synthesis reaction in which industrial gases take part, since they can poison the catalysts used to promote such reactions.

Prior to using in synthesis an industrial gas containing COS and/or CS$_2$ impurities, it is necessary to subject that gas to a very complicated purification in order to eliminate the sulfur compounds.

The purification techniques by washing with regenerable selective liquid absorbent such as an amine solution, which are usually utilized for eliminating H$_2$S contained in the gases, are not generally effective for eliminating COS and CS$_2$, since these compounds are not absorbed by the absorbent liquid.

The COS and CS$_2$ compounds could be eliminated by putting the gas to be purified in which they are contained in contact with a solid absorbent of the zinc oxide type that irreversibly fixes said compounds. This involves a considerable consumption of solid absorbent which makes such a purification method uneconomical and significantly reduces its attractiveness. Besides, it is not possible to use this method of purification when some of the essential components of the gas to be purified are likely to react with the solid absorbent, as is the case when the gas to be treated contains H$_2$S.

It is known that the gases treated in the catalytic converters of a sulfur unit contain small quantities of COS and CS$_2$ together with a larger quantity of H$_2$S and SO$_2$ reagents that take part in the CLAUS reaction for the formation of sulfur. Since a substantial quantity of water vapor of about 30% by volume is present, the COS and CS$_2$ compounds undergo a partial hydrolysis in H$_2$S when in contact with the CLAUS catalyst present in the catalytic converters due to the high water vapor content of the treated gases. The hydrolysis is noticeable in the first converter where the temperature is about 350° C. and negligible in the converters that follow where the temperature is lower.

In particular in European patent application published under No. 0060741, it is shown that when a catalyst containing TiO$_2$ and a sulfate of an alkaline earth metal, is in contact with small concentrations of CS$_2$ and COS compounds namely, 1% by volume for CS$_2$ and 0.3% by volume for COS, in a gas containing more considerable quantities of H$_2$S and of CO$_2$ and a substantial quantity of water vapor (28% by volume), that is, in a gas having substantially the composition of the gases treated in the first converter of a sulfur plant, the CS$_2$ and COS are completely hydrolyzed in H$_2$S at a temperature of 340° C. In the case of the hydrolysis of the CS$_2$, example 10 of the above European patent application, the quantity of water vapor contained in the reaction mixture corresponds to a value of the molar ratio H$_2$O:CS$_2$ equal to 28, while in the case of the hydrolysis of the COS, example 11 of the application, the quantity of water vapor present in the reaction mixture corresponds to a value of the molar ratio H$_2$O:COS equal to 93.

SUMMARY OF THE INVENTION

It has been found that it is possible to eliminate almost totally the COS and CS$_2$ compounds present in an industrial gas in total concentration that may amount to several percents by volume by having recourse to a hydrolysis to H$_2$S using catalysts having a base of titanium oxide. In particular, the above mentioned catalysts having a base of titanium oxide and of a sulfate of an alkali earth metal, can be employed at lower temperatures and with quantities of water less than that taught in the above cited European patent application.

DETAILED DESCRIPTION OF THE INVENTION

The process according to the invention for elimination of the COS and CS$_2$ compounds contained in a small total concentration in an industrial gas is of the type wherein the gas containing an appropriate quantity of water vapor is contacted with a catalyst having a base of titanium oxide in a reaction zone at elevated temperature, and it is characterized by controlling the quantity of water vapor present in the gas in contact with the catalyst in a manner such that in the gas the ratio R of the number of moles of water vapor to the number of moles of the COS and CS$_2$ compound or compounds present in the gas has a value going from the stoichiometric value for a complete hydrolysis of said compounds to $50/1+1.5p$, with p representing the molar fraction of CS$_2$ in the total molar quantity of COS and CS$_2$ contained in the gas, and maintaining the temperature in the reaction zone at values corresponding to temperature at the exit of said zone comprised between $\theta_1 = 100 \,(0.6+1.6q)°C.$ and $\theta_2 = 100 \,(2.2+q)°C.$, q having the value zero if p has a value of from zero to 0.1 and the value 1 in the other cases.

By the expression "reduced total concentration", which designates the concentration of COS and of CS$_2$ when only one of the compounds is present in the gas to be treated or also the total concentration of the COS and CS$_2$ compounds when the gas to be treated contains both compounds, is understood a concentration by volume of from 0.01% to 6% and more particularly of from 0.05% to 4%.

The temperature in the reaction zone is preferably kept at values corresponding to temperatures at the exit of said zone going from $100 \,(1+1.5q)°C.$ to $100(2+q)°C.$, q having the same meaning as above.

The contact period of the reaction mixture with the catalyst can advantageously be of from (4-2q) seconds to (10-2q) seconds and preferably from (5-2q) seconds to (8-2q) seconds, q being defined as indicated above.

When the gas to be treated contains COS as the only organic sulfur compound or COS and CS$_2$ in proportions corresponding to values of p at most equal to 0.1, the process is preferably carried out by controlling the quantity of water vapor in the gas put into contact with the catalyst in order that the R ratio has a value of from 5 to 25, by maintaining the temperature in the reaction zone at values corresponding to the temperatures at the exit of said zone going from 100° to 200° C., and by selecting a period of contact of the reaction mixture with the catalyst of from 5 to 8 seconds.

When the gas to be treated contains $CS_2$ as the only organic sulfur compound, the process is preferably carried out by controlling the quantity of water vapor in the gas put into contact with the catalyst in order that the R ratio has a value of from 5 to 20, by maintaining the temperature in the reaction zone at values corresponding to temperatures at the exit of said zone of from 250° to 300° C., and by selecting a period of contact of the reaction mixture with the catalyst of from 3 to 6 seconds.

When the gas to be treated contains both COS and $CS_2$ in proportions corresponding to values of p above 0.1, the process is preferably carried out by controlling the quantity of water vapor in the gas put into contact with the catalyst in order that the R ratio has a value of from 5 to 25, by maintaining the temperature in the reaction zone at values corresponding to the temperatures at the exit of said zone of from 250° to 300°, and by selecting a period of contact of the reaction mixture with the catalyst of from 5 to 8 seconds.

The quantity of water vapor in the gas contacting the catalyst can be controlled by adding water vapor to the gas to be treated if the content of water vapor of the latter is insufficient or by condensing part of the water vapor if the content of water vapor of said gas is too high. When the gas to be treated has a content of water vapor within the limits according to the invention, it can be brought into contact with the catalyst without an adjustment of its water vapor content being necessary.

The temperature of the gas to be treated that contains the appropriate quantity of water vapor at the moment of putting it into contact with the catalyst must have a value sufficient for the temperature of the reaction mixture at the exit of the reaction zone to have the desired value. If necessary, the gas to be treated that contains the appropriate quantity of water vapor is subjected to a pre-heating in order to adjust its temperature to a convenient value.

Depending on the requirements of the synthesis process in which the gas treated according to the invention is involved, the $H_2S$ resulting from the hydrolysis of the COS and $CS_2$ compounds may or may not be eliminated from the treated gas in which it is contained. If necessary, all or part of the water vapor contained in the treated gas can be separated. The operations of elimination $H_2S$ and of separation of water vapor can be carried out by making use of techniques that are well known in the art for this purpose. Thus the $H_2S$ can be eliminated by washing the gas treated according to the invention by means of a regenerable absorbent liquid that reversibly fixes the $H_2S$. Such a regenerable absorbent liquid may consist in particular of an aqueous solution of an amine or of an aminoacid and especially of an aqueous solution of an alkanolamine such as monoethanolamine, diethanolamine, triethanolamine, methyldiethanolamine and diisopropanolamine. Any $H_2S$ that still remains in the gas after being washed with the regenerable absorbent liquid can be trapped by passing the gas into a bed of a metallic oxide such as ZnO that irreversibly fixes the $H_2S$.

As indicated above, the catalyst used in the process according to the invention has a base of titanium oxide and more particularly contains a major proportion by weight of titanium oxide. The catalyst in particular consists of titanium oxide or a mixture of titanium oxide and a sulfate of an alkaline earth metal which is preferably selected from the group of calcium, barium, strontium and magnesium, with the preferred alkaline earth sulfate being calcium sulfate.

The aforementioned catalyst that include titanium oxide as well as a sulfate of alkaline earth metal can also contain, up to 30% of their weight, of at least one constituent chosen among silica, alumina, clays, silicates, titanium sulfate and ceramic fibers.

In the catalysts used according to the invention that contain titanium oxide and an alkaline earth metal sulfate with or wihout an additional constituent of the type cited above, the ratio of the proportion by weight of titanium oxide expressed as $TiO_2$ to the proportion by weight of alkaline earth metal sulfate in the calcined catalyst can be from about 99:1 to about 60:40, preferably from about 99:1 to about 80:20.

The above defined catalysts have specific surface areas measured by the nitrogen absorption method called BET, comprised between 5 and 300 $m_2$/g and preferably between 10 and 240 $m^2$/g, and total porous volumes, determined by the mercury penetration method, comprised between 0.05 and 0.6 $cm_3$/g and preferably between 0.1 and 0.4 $cm^3$/g. The resistance to attrition of said catalysts is less than 2%.

The resistance to attrition is defined in % by the number that represents in grams the quantity of dust produced by vibrating during 10 minutes, by means of a vibrator of the trademark FENWICK REX, 100 grams of granules of catalyst placed on a sieve No. 24 having 20 cm of diameter of the series AFNOR X 11-501.

The catalysts used according to the invention can be prepared by any method known in the art.

A catalyst containing titanium oxide and additional constituents of the type cited above can be prepared by using, for example, the method described in French Pat. No. 80 09126 (publication No. 2,481,145) of Apr. 23, 1980. For obtaining a catalyst containing titanium oxide, an alkaline earth metal sulfate and an additional constituent such as mentioned above, use can be made of one or other of the methods described in the European patent application published under No. 0060741.

The process according to the invention offers a convenient means for eliminating the COS and $CS_2$ impurities contained in different industrial gases and thus makes such gases suitable for use in the organic syntheses for which they have been produced.

Thus, by using the process according to the invention, it is possible, for example, to produce a synthesis gas containing $H_2$ and CO and that can be used for a methanation reaction starting from a gas proceeding from the gasification of coal and containing $CS_2$, COS and $H_2S$ as undesirable impurities. To do this, the gas of coal gasification is first treated according to the invention for transforming $CS_2$ and COS in $H_2S$, then the gas thus treated is subjected first of all to a washing by means of a regenerable liquid absorbent such as an aqueous solution of methyl diethanolamine for fixing most of the $H_2S$ present in the gas and then to a final purification by passing on a metallic oxide such as ZnO for trapping the last traces of H2S.

The process according to the invention can likewise be used for treating a gas consisting mostly of $H_2S$ and containing $CS_2$ and/or COS by way of undesirable impurities and thus producing a gas that can be used as source of $H_2S$ for the synthesis of thioorganic compounds. In this case, the treatment according to the invention applied to the gas, proves to be specially interesting since the hydrolysis product of $CS_2$ and COS, namely $H_2S$ need not be eliminated and the gas proceeding from the treatment can be directly used in the synthesis reaction of the thioorganic product.

The invention is illustrated by the non-limiting examples that follow.

EXAMPLE 1

A gas obtained from the gasification of coal and having the following composition by volume was treated in accordance with the process of the present invention.

| | |
|---|---|
| CO | 47% |
| $H_2$ | 42% |
| $H_2O$ | 1.6% |
| $CO_2$ | 6% |
| $H_2S$ | 1.4% |
| COS | 0.1% |
| $N_2$ | 1.9% |

For this treatment the process was carried out in a reactor containing a catalyst comprised of titanium oxide and calcium sulfate and prepared as described in Example 5 of European Patent Application No. 00 60741.

The catalyst had the following characteristics:

| | |
|---|---|
| Gravimetric content of $TiO_2$ | 89.8% |
| Gravimetric content of $CaSO_4$ | 10.2% |
| Specific surface BET | 146 $m^2/g$ |
| Total porous volume | 0.35 $cm^3/g$ |
| Resistance to attrition | 0.4 |

The gas to be treated for which the R ratio of the number of moles of water vapor to the number of moles of COS was equal to 16 and therefore needed no adjustment was introduced in the reactor with a delivery corresponding to a VVH equal to 600 $h^{-1}$, the period of contact of the gas with the catalyst being 6 seconds. The temperature of the gas brought to the reactor was such that the temperature at the exit of the reactor was maintained at 160° C.

The gas emerging from the reactor contained no more than 10 vpm COS, which corresponds to a yield of conversion of the COS to $H_2S$ equal to 99%.

Tests of long duration under the above conditions showed that the elevated activity of the catalyst was maintained even after several months of operation.

EXAMPLE 2

There was treated a gas which served as a source of $H_2S$ for the synthesis of thioorganic products and containing, by volume, 93.56% $H_2S$, 1.46% COS and 4.98% $CO_2$, was treated by the process of the invention.

To this gas was added a quantity of water vapor representing 30% of the volume of the gas and the reaction mixture thus obtained, for which the R ratio of the number of moles of water vapor to the number of moles of COS was equal to 20, was introduced in a reactor containing a catalyst identical with the one used in Example 1 with a delivery corresponding to a VVH equal to 600 $h^{-1}$, the period of contact of the reaction mixture with catalyst being 6 seconds. The temperature of the reaction mixture brought to the reactor was such that the temperature at the exit of the reactor was equal to 160° C. throughout the duration of the treatment.

The effluent emerging from the reactor contained no more than 100 vpm COS, which corresponds to a conversion yield of the COS to $H_2S$ equal to 99.3%.

Tests of long duration under the above conditions showed that this value of the conversion yield was maintained, which means that it was maintained in the time of elevated activity of the catalyst.

Observing the same working conditions as the ones just described, the gas containing $H_2S$ defined at the beginning of this example was treated after the addition of 0.5 by volume of oxygen. The rate of conversion of the COS to $H_2S$ preserved the above mentioned value for several months of operation, which shows the stability of the catalyst while in the presence of oxygen.

EXAMPLE 3

A gas which served as a source of $H_2S$ for the synthesis of thioorganic products and containing, by volume, 93.5% $H_2S$, 0.9% $CS_2$ and 5.6% $CO_2$ was treated by the process of the invention.

To this gas was added a quantity of water vapor representing 15% of the volume of the gas and the reaction mixture thus formed, for which the R ratio of the number of moles of water vapor to the number of moles of $CS_2$ was equal to 16.7, was introduced in a reactor containing a catalyst identical with the one described in Example 1 with a delivery corresponding to a VVH equal to 900 $h^{-1}$, the period of contact of the reaction mixture with the catalyst being 4 seconds. The temperature of the reaction mixture brought to the reactor was such that the temperature at the exit of the reactor was equal to 290° C. throughout the treatment.

The effluent emerging from the reactor contained less than 10 vpm $CS_2$, which corresponds to a conversion yield of $CS_2$ to $H_2S$ above 99.8%.

In the course of tests of long duration, the conversion rate of $CS_2$ to $H_2S$ preserved the above mentioned value after several months of operation.

Observing the same working conditions as those just described, the gas containing $H_2S$ defined at the beginning of this example was treated after the addition of 0.5% by volume of oxygen. The rate of conversion of the $CS_2$ preserved the above mentioned value for several months of operation.

EXAMPLE 4

A gas was treated containing, by volume, 93.5% $H_2S$, 0.9% $CS_2$, 1.5% COS and 4.1% $CO_2$, this gas being used as source of $H_2S$ in the synthesis of thioorganic products.

To this gas was added a quantity of water vapor representing 30% of the volume of the gas and the reaction mixture thus formed, for which the R ratio of the number of moles of water vapor to the total number of moles of COS and $CS_2$ was equal to 12.5, was introduced in a reactor containing a catalyst identical with the one described in Example 1 with a delivery corresponding to a VVH equal to 600 $h^{-1}$, the period of contact of the reaction mixture with the catalyst being 6 seconds.

The temperature of the reaction mixture brought to the reactor was such that the temperature at the exit of the reactor was equal to 260° C. throughout the duration of the treatment. This temperature corresponded to the temperature leading to a minimum rejection rate of COS+$CS_2$ in the effluent.

The effluent leaving the reactor contained a total of 350 vpm COS and $CS_2$ (50 vpm $CS_2$ and 300 vpm COS), which corresponds to a total conversion rate equal to 98.5%. This conversion rate was maintained after several months of operation.

Keeping the same working conditions as those just described, the gas containing H₂S defined at the beginning of this example was treated after the addition of 0.5% by volume of oxygen. The conversion rate of the COS and CS₂ impurities remained at 98.5% during several months of operation.

EXAMPLE 5

A gas was treated as a source of H₂S for the synthesis of thioorganic products and containing, by volume, 94% $H_2S$, 1% COS and 5% $CO_2$.

To this gas was added a quantity of water vapor representing 6% of the volume of the gas and the reaction mixture thus obtained, for which the R ratio of the number of moles of water vapor to the number of moles of COS was equal to 6, was introduced in a reactor containing a catalyst identical with the one used in Example 1 with a delivery corresponding to a VVH equal to 600 $h^{-1}$, the period of contact of the reaction mixture with the catalyst being 6 seconds. The temperature of the reaction mixture brought to the reactor was such that the temperature at the exit of the reactor was equal to 165° C. throughout the duration of the treatment.

The effluent having the reactor contained no more than 90 vpm of COS, which corresponds to a yield of conversion of the COS to H2S equal to 99.1%.

This rate of conversion was still maintained after several months of operation.

EXAMPLE 6

The procedure was carried out as described in Example 5, but substituting for the catalyst having a base of TiO₂ and of calcium sulfate a catalyst consisting of extrusion products of titanium oxide having a diameter of 5 mm.

The catalyst had the following characteristics:

| | |
|---|---|
| specific surface | 160 m²/g |
| total porous volume | 0.37 cm³/g |
| resistance to attrition | 1.1% |

The gaseous effluent leaving the reactor contained no more than 80 vpm of COS, which corresponds to a yield of conversion of COS to H₂S equal to 99.2%. This rate of conversion was still maintained after several months of operation.

The values of periods of contact given in this specification and associated claims have been defined under normal pressure and temperature conditions. It is the same for the VVH values indicated in the examples.

We claim:

1. A process for the reduction of COS and CS₂ compounds contained in concentrations of from 0.01 to 6% by volume in a gas containing water vapor which comprises: contacting the gas containing water vapor, in a reaction zone, with a catalyst selected from the group consisting of (a) titanum dioxide, (b) a mixture of titanium dioxide with a sulfate of an alkaline earth metal selected from the group consisting of Ca, Ba, Sr and Mg in a weight ratio of titanium dioxide, expressed as TiO₂, to alkaline earth metal sulfate of from about 99:1 to about 6:4 or (c) a mixture of (a) or (b) with up to about 30% by weight, of the mixture, of at least one composition selected from the group consisting of silica, clay, alumina, silicates, titanium sulfate and ceramic fibers; controlling the quantity of water vapor present in the gas in contact with the catalyst in a manner such that in said gas the R ratio of the number of moles of water vapor to the number of moles of COS and CS₂ compounds present in the gas have a value of from the stoichiometric value corresponding to a complete hydrolysis of said compounds to 50/1+1.5 p, with p representing the molar fraction of CS₂ in the total molar quantity of COS and CS₂ contained in the gas; and by maintaining the temperature in the reaction zone at a value corresponding to the temperature at the exit of said zone comprised between $\phi_1 = 100 \ (0.6+1.6q)°C.$ and $\phi_2 = 100 \ (2.2+q)°C.$, wherein q has a value of zero when p has a value of from 0 to 0.1, or the value 1 when p has another value.

2. A process according to claim 1, wherein the temperature in the zone of reaction is maintained at values corresponding to the temperatures at the exit of said zone of from $100 \ (1+1.5q)°C.$ to $100 \ (2+q)°C.$ 3. A process according to claim 1 wherein the period of contact of the reaction mixture with the catalyst is from (10-2q) seconds to (4-2q) seconds.

4. A process according to claim 1 wherein the gas to be treated contains COS as the only organic sulfur compound or COS together with CS₂ in proportions corresponding to a p value not greater than 0.1, the quantity of water vapor in the gas in contact with the catalyst is such that the R ratio has a value of from 5 to 25, the temperature in the reaction zone corresponds to the temperatures at the exit of said zone of from 100° to 200° C. and the period of contact of the reaction mixture with the catalyst is from 5 to 8 seconds.

5. A process according to claim 1 wherein the gas to be treated contains CS₂ as the only organic sulfur compound, the quantity of water vapor in the gas in contact with the catalyst is such that the R ratio has a value of from 5 to 20, the temperature in the reaction zone corresponds to the temperature at the exit of said zone of from 250° to 300° C. and the period of contact of the reaction mixture with the catalyst is from 3 to 6 seconds.

6. A process according to claim 1 wherein the gas to be treated contains both CS₂ and COS in proportions corresponding to p values above 0.1 the quantity of water vapor in the gas in contact with the catalyst is such that the R ratio has a value of from 5 to 25, the temperature in the reaction zone corresponds to the temperatures at the exit of said zone of from 250° to 300° C., and the period of contact of the reaction mixture with the catalyst is from 5 to 8 seconds.

7. A process according to claim 1 wherein the catalyst has a specific surface area comprised between 5 and 300 m²/g.

8. A process according to claim 1 wherein the catalyst has a total porous volume comprised between 0.05 and 0.6 cm³/g.

9. A process according to claim 1 wherein the effluent from the reaction zone is subjected to a treatment for elimination of any H₂S.

10. A process according to claim 9, wherein the gas to be treated is a gas generated from the gasification of coal.

11. A process according to claim 1 wherein the gas to be treated is a gas consisting mostly of H₂S and contains at least one of COS or CS₂ as an impurity.

12. A process according to claim 1 wherein at least some of the water vapor contained in the effluent proceeding from the reaction zone is recovered.

* * * * *

UNITED STATES PATENT AND TRADEMARK OFFICE
CERTIFICATE OF CORRECTION

PATENT NO.   : 4,735,788
DATED        : April 5, 1988
INVENTOR(S)  : Robert Voirin It is certified that error appears in the above-identified patent and that said Letters Patent is hereby corrected as shown below:

Column 1, line 64:   "$CO_2$" should read --$SO_2$--.

Column 7, line 27:   "having" should read --leaving--.

Column 7, line 65:   "6:4" should read --60:40--.

Signed and Sealed this

Twenty-fourth Day of January, 1989

Attest:

DONALD J. QUIGG

*Attesting Officer*        Commissioner of Patents and Trademarks